United States Patent [19]

Franco

[11] Patent Number: 4,852,739

[45] Date of Patent: Aug. 1, 1989

[54] TRANSPORT/DISPLAY PACKAGE FOR MAGNETIC TAPE CASSETTES

[75] Inventor: Jack D. Franco, Deal, N.J.

[73] Assignee: Franco Manufacturing Co., Inc., Metuchen, N.J.

[21] Appl. No.: 227,778

[22] Filed: Aug. 3, 1988

[51] Int. Cl.⁴ .......................................... B65D 85/672
[52] U.S. Cl. ................................................. 206/387
[58] Field of Search ............... 206/387, 307, 309, 312, 206/313, 232

[56] References Cited

U.S. PATENT DOCUMENTS 4,141,446 2/1979 Cliffe .................................... 206/387

FOREIGN PATENT DOCUMENTS 3316802 11/1984 Fed. Rep. of Germany ...... 206/387

Primary Examiner—Carroll B. Dority, Jr.
Attorney, Agent, or Firm—Steinberg & Raskin

[57] ABSTRACT

A transport/display package cushions a magnetic tape cassette from exterior shocks between a pair of folded bedding sheets of soft fabric material. A pocket folder holds the bedding sheets with the cassette sandwiched therebetween in fixed positions for insertion into a transparent envelope.

12 Claims, 2 Drawing Sheets

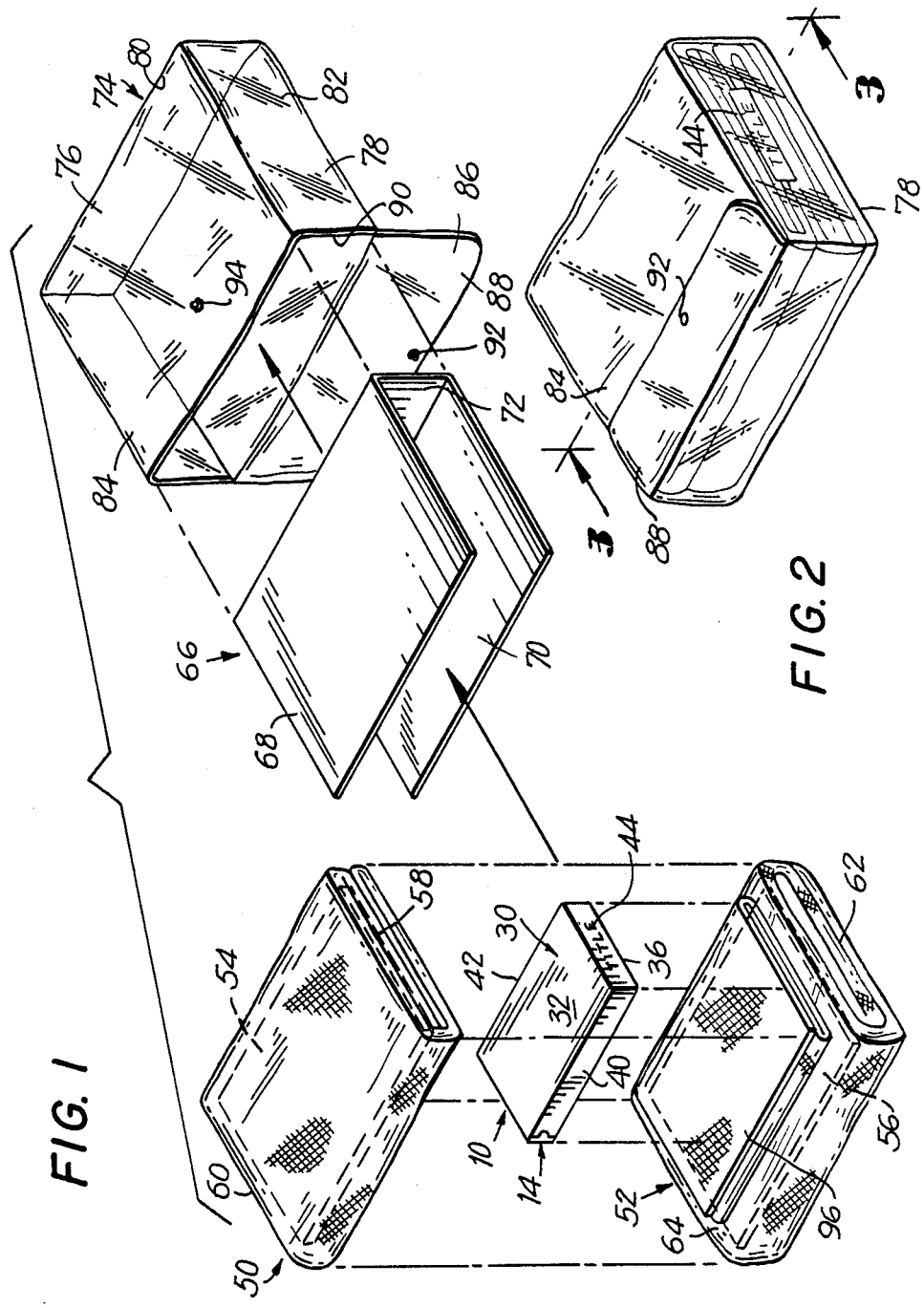

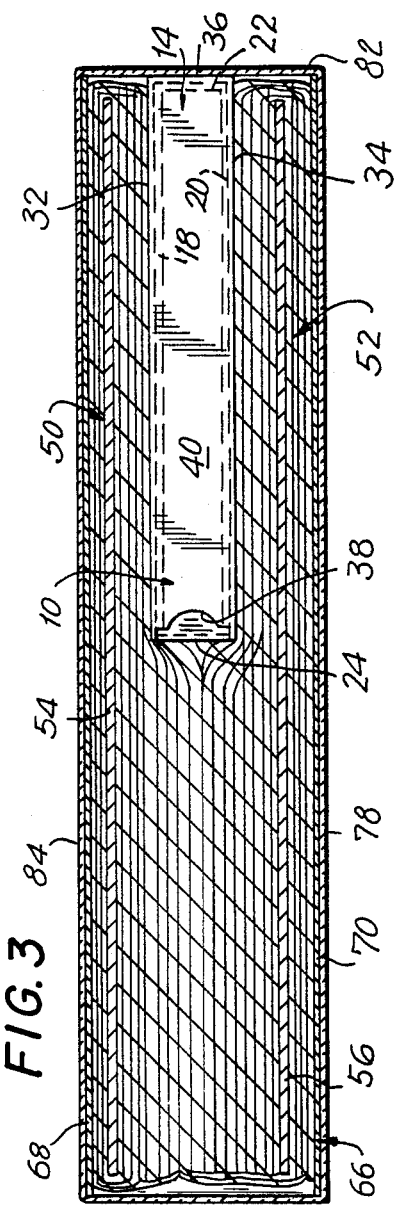
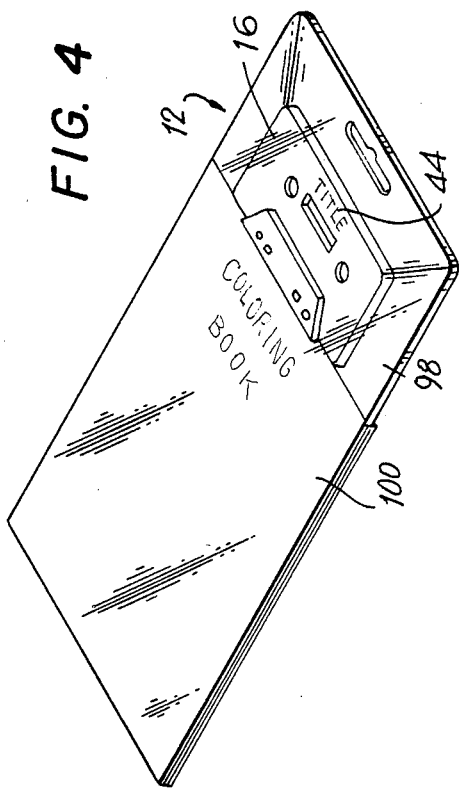
FIG. 3
FIG. 4

TRANSPORT/DISPLAY PACKAGE FOR MAGNETIC TAPE CASSETTES

BACKGROUND OF THE INVENTION

1. Field of the Invention

This invention generally relates to a package for transporting and/or displaying magnetic tape cassettes of the type conventionally used in magnetic recording/playback apparatus and, more particularly, to a cushioned package highly resistant to exterior shocks of the kind generally encountered during such transport and/or display.

2. Description of Related Art

Conventional magnetic tape cassettes, such as video and audio tape cassettes, include a plastic housing in which magnetic tape is held. Such plastic housings may crack, chip or be otherwise damaged during transport of the cassette from its place of manufacture to a distribution center or retail outlet, or from the retail store to its place of use. Also, the cassettes might be damaged while on display at a retail store, particularly if roughly handled by store personnel or the public.

Tape cassettes are often packaged in thin, pressed board boxes or in thick plastic casings. Experience has shown, however, that thin board boxes only serve, at best, to minimally protect the cassettes from damage. The plastic casings rely upon their inherent mass and rigidity to protect the cassettes therein. No matter whether thin board or thicker plastic casings are used to contain the housings, cassette manufacturers still resort to high impact plastic housings to protect the tapes stored therein.

SUMMARY OF THE INVENTION

1. Objects of the Invention

It is a general object of this invention to prevent damage to magnetic tape cassettes during transport and/or display.

It is another object of this invention to provide a cushioned package for protecting a magnetic tape cassette from damage due to exterior shocks.

Still another object of this invention is to provide a novel and esthetic point-of-sale package in which the presence of the cassette is readily determinable without requiring the purchaser to open the package.

A further object of this invention is to provide a package which readily absorbs shocks from causing damage to a magnetic tape cassette therein.

2. Features of the Invention

In keeping with these objects, and others which will become apparent hereinafter, one feature of this invention resides, briefly stated, in a transport/display package comprising means for cushioning a tape cassette from exterior shocks. The tape cassette hols a magnetic tape for use in a magnetic recording/ playback apparatus. The cassette has opposite major walls between which the tape is held.

The cushioning means includes a pair of folded bedding sheets of soft fabric material, e.g. cotton, cotton-polyester blends, satin or silk Each folded sheet is situtated at a respective major wall of the cassette. The sheets sandwich a cassette therebetween. Each sheet is folded over upon itself multiple times to form a plurality of generally rectangular sheet portions stacked one above another. The sheet portions of each folded sheet are sufficient in number to cushion effectively the cassette from exterior shocks directed toward the respective major wall at which the respective folded sheet is situated.

The package includes an envelope in which the folded sheets and the tape cassette sandwiched therebetween are inserted. Means are provided on the envelope for selectively opening and closing the same. Means are also provided for holding the folded sheets in position relative to the major walls of the tape cassette during simultaneous insertion of the folded sheets with the cassette sandwiched therebetween into the envelope when the latter is opened.

In a preferred embodiment, a generally rectangular shaping element is located within each folded sheet. Each sheet is folded over not only upon itself, but also upon a respective shaping element which serves as a convenient form to facilitate said folding. Each shaping element also assists the folded sheets in absorbing exterior shocks and protecting the cassette.

The tape cassette may include a container therefor, the container having a generally planar panel bearing indicia which visually identify the cassette. In this event, the envelope is provided with a transparent section facing the indicia-bearing panel. The indicia are visible through the transparent section.

Each folded sheet has opposite ends, and marginal sheet edges lying in a common plane at each of said ends. In a preferred embodiment, the tape cassette is located closer to one of said ends than to the other of said ends. The indicia-bearing panel is positioned in the same plane as the marginal sheet edges to enable the indicia thereon to be readily inspected.

The holding means is constituted of a support pocket having two generally planar support portions and a base portion connecting the latter. Each support portion overlies an outermost sheet portion of a respective folded sheet, and enables all of the contents of the package, namely, the folded sheets and the cassette, to be simultaneously inserted as a unit into the envelope.

The folded sheets on either side of the cassette absorb shocks directed not only toward the aforementioned major walls thereof, but also overlap side and at least one of the end walls of the cassette to absorb any exterior shocks directed toward any of said other walls. The soft, yielding nature of each stack of folded sheet portions closely embraces the cassette and prevents the latter from shifting away from its protected position between the sheets.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 1 is an exploded front perspective view of a package in accordance with this invention, showing the contents of the package in isolated views;

FIG. 2 is a front perspective view of the package of FIG. 1 after it has been fully packed with a video tape cassette;

FIG. 3 is an enlarged sectional view taken on line 3—3 of FIG. 2, looking in the direction of the arrows; and FIG. 4 is a perspective view of an audio cassette assembly which can be inserted in the package of FIG. 1 as a replacement for the video tape cassette.

DETAILED DESCRIPTION OF THE PREFERRED EMBODIMENTS

Referring now to the drawings, reference numeral 10 in FIG. 1 generally identifies a boxed video tape cassette, and reference numeral 12 in FIG. 4 generally identifies an unboxed audio tape cassette. Either one of these cassettes can be packed in the transport/display package of this invention.

Each cassette 10, 12 respectively includes synthetic plastic material housings 14, 16 in which a magnetic tape for use in a magnetic recording/playback apparatus, e.g. a video tape recorder or an audio cassette player, is held. Housing 14, for example, as best shown in FIG. 3, has a generally parallelepiped shape with planar walls including an upper wall 18, a lower wall 20, a pair of end walls 22, 24, and a pair of side walls. Housing 14 is closely received in a container or box 30 which also has a parallele-piped shape with planar panels including an upper panel 32, a lower panel 34, an end panel 36, an open end 38 through which housing 14 passes, and a pair of side panels 40, 42.

As shown in FIGS. 1 and 2, end panel 36 of box 30 bears indicia 44 which identify the cassette. Thus, if the cassette has pre-recorded information such as a cartoon, the title of the cartoon is affixed to end panel 36. As shown in FIG. 4, where there is no box for the cassette, the indicia 44 are applied directly on the housing itself.

Returning to FIG. 1, in order to protect the boxed cassette from damage from exterior shocks, means are provided for yieldingly absorbing such shocks for thereby cushioning the cassette. Such cushioning means includes a pair of folded bedding sheets 50, 52 of soft fabric material, e.g. cotton, cotton-polyester blends, satin or silk. Folded sheets 50, 52 sandwich the cassette 10 therebetween.

Two generally rectangular planar shaping elements 54, 56 are inserted within the folded sheets 50, 52, respectively. Each shaping element is a thin, shape-retaining board constituted of thick paper or cardboard. Each folded sheet is folded over upon itself and upon a respective shaping element multiple times to form a plurality of generally rectangular sheet portions stacked one above another. Each shaping element serves not only as a convenient form for facilitating the folding of its respective sheet, but also as a protector to assist the folded sheets in absorbing exterior shocks. The number of sheet portions in each stack are sufficient effectively to cushion the cassette. In a preferred embodiment, the thickness of each entire stack of sheet portions is on the order of one inch thick, thereby constituting on the order of ten or more sheet portions.

Folded sheets 50, 52 directly engage upper and lower panels 32, 34 of the box 30 and, if unboxed as in the case of the audio cassette of FIG. 4, the folded sheets 50, 52 directly engage upper and lower walls of the cassette housing. In either event, the number of sheet portions in each stack, together with the combined soft, yielding cushion effect, due to the number of such sheet portions, protects the upper and lower walls of the cassette. The sheet portions are longer and wider than the corresponding length and width dimensions of the cassette so as to cause the sheet portions to also overlie the side walls and at least one end wall of the cassette, thereby also protecting these additional walls from exterior shocks.

Folded sheets 50, 52 have opposite ends 58, 60; 62, 64, and marginal sheet edges lying in a common plane at each of said ends. The cassette is located closer to one of said ends, e.g. 58, 62, than to the other of said ends 60, 64. In fact, the cassette is offset relative to the folded sheets so that the end panel 36 of the box 30 is positioned to lie in the same plane as said marginal sheet edges.

Means are also provided for holding the folded sheets 50, 52 in position relative to the major walls of the cassette. Such holding means advantageously includes a pocket folder 66 having two generally planar support portions 68, 70, and a base portion 72 interconnecting the support portions. Support portions 68, 70 overlie outermost sheet portions of a respective folded sheet. The pocket folder 66 bounds an interior in which the folded sheets with the cassette sandwiched therebetween are held in a unitary assembly for simultaneous insertion of the entire assembly into an envelope 74. Envelope 74 is constituted of transparent synthetic plastic material, and has wall sections arranged in a parallelepiped configuration. The wall sections include upper 76 and lower 78 sections, end section 80, side sections 82, 84, and top section 86 having a flap 88. Envelope 74 has an open mouth 90 which is covered and/or exposed by movement of the top section 88. A fastener 92 is provided on flap 88, and a complementary fastener 94 is provided on upper section 76. The fasteners preferably engage each other with a snap-type action in order to close the envelope with the aforementioned assembly therein.

Side section 82 faces the indicia-bearing panel 36 of the box 30, and enables the indicia 44 thereon to be visible through the side section 82. In this way, the presence of the cassette, as well as the nature of the cassette, can be readily ascertained without having to open the package.

Returning to FIG. 1, the package of this invention need not be limited to the use of two folded sheets to achieve the above-described cushioning action. In addition, at least one folded pillowcase 96 of soft fabric material is sandwiched between the folded bedding sheets. The pocket folder 66 also holds said one pillowcase in relative position between the folded bedding sheets during their insertion into the envelope 74.

Additional identifying and/or advertising information may be provided on the support and base portions of the pocket folder 66, since those portions face and are visible through sections 76, 78 and 80 of the envelope.

In the alternate embodiment of FIG. 4, a packet contains the housing 16 and a coloring book 100 mounted on a backing 98 and overwrapped by transparent plastic film.

In still another variant of this invention, rather than using two folded bedding sheets, a single bedding sheet having sheet portions on either side of the cassette can be employed.

In an advantageous construction, each bedding sheet is imprinted with graphic markings, e.g. cartoon characters, in which event, it is advantageous if the magnetic tape cassette contains magnetically encoded data corresponding to said graphic markings.

It will be understood that each of the elements described above, or two or more together, also may find a useful application in other types of constructions differing from the types described above.

While the invention has been illustrated and described as embodied in a transport/display package for magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A transport/display package, comprising:
   (a) a tape cassette for holding a magnetic tape for use in a magnetic recording/playback apparatus, said tape cassette having opposite major walls between which the tape is held;
   (b) means for cushioning the tape cassette from exterior shocks, including a pair of folded bedding sheets of soft fabric material, each situated at a respective major wall of the tape cassette, said folded sheets sandwiching the tape cassette therebetween, each folded sheet being folded over upon itself multiple times to form a plurality of generally rectangular sheet portions stacked one above another, said sheet portions of each folded sheet being sufficient in number to cushion effectively the tape cassette from exterior shocks directed toward the respective major wall at which the respective folded sheet is situated;
   (c) an envelope in which the folded sheets and the tape cassette sandwiched therebetween are insertable;
   (d) means for selectively opening and closing the envelope; and
   (e) means for holding the folded sheets in position relative to the major walls of the tape cassette during simultaneous insertion of the folded sheets with the tape cassette sandwiched therebetween into the envelope when the envelope is opened.

2. The package as recited in claim 1, wherein the cushioning means includes generally rectangular shaping element within each folded sheet, each folded sheet being folded over upon a respective shaping element.

3. The package as recited in claim 1, wherein the tape cassette includes a container for containing the tape cassette, said container having a generally planar panel bearing indicia visually identifying the tape cassette; and wherein the envelope has a transparent section facing the indicia-bearing panel of the container and through which section the indicia are visible.

4. The package as recited in claim 3, wherein each folded sheet has marginal sheet edges stacked one above another in a common plane with the indicia-bearing panel of the container.

5. The package as recited in claim 3, wherein each folded sheet has opposite ends spaced apart from each other by a predetermined distance along a longitudinal direction, and wherein the cassette has an end wall spaced apart from the indicia bearing panel along the longitudinal direction by a distance shorter than said predetermined distance, said end wall being overlaid and cushioned from exterior shocks by the folded sheets.

6. The package as recited in claim 1; and further comprising at least one folded pillow case of soft fabric material sandwiched between the folded bedding sheets, and wherein the holding means is also operative for holding said at least one pillow case between the folded bedding sheets during said insertion into the envelope.

7. The package as recited in claim 1, wherein the holding means includes a support pocket folder having two generally planar support portions, each overlying an outermost sheet portion of a respective folded sheet, and a base portion connecting the support portions.

8. The package as recited in claim 1, wherein the envelope has a generally parallelepiped shape and is constituted of a synthetic plastic transparent material; and wherein the opening/closing means includes a snap fastener on the envelope.

9. The package as recited in claim 3, wherein the tape cassette is a video cassette and wherein the container is a box having an opening through which the video cassette passes.

10. The package as recited in claim 1, wherein the tape cassette is an audio cassette.

11. A transport/display package, comprising:
   (a) a tape cassette for holding a magnetic tape for use in a magnetic recording/playback apparatus, said tape cassette having opposite major walls between which the tape is held;
   (b) means for cushioning the tape cassette from exterior shocks, including a pair of folded bedding sheets of soft fabric material, each situated at a respective major wall of the tape cassette, said folded sheets sandwiching the tape cassette therebetween, each folded sheet having a generally rectangular planar shaping element inserted therein, each folded sheet being folded over upon itself and upon a respective shaping element multiple times to form a plurality of generally rectangular sheet portions stacked one above another, each shaping element and the respective sheet portions of each folded sheet together cushioning the tape cassette from exterior shocks directed toward the respective major wall at which the respective folded sheet is situated, each folded sheet having opposite ends and marginal sheet edges lying in a common plane at each of said ends, said tape cassette being located closer to one of said ends than to the other of said ends;
   (c) an envelope of transparent synthetic plastic material and having wall sections arranged in a parallelepiped configuration, said wall sections bounding an interior in which the folded sheets and the tape cassette sandwiched therebetween are insertable through an envelope mouth, and a flap mounted for movement over and away from the mouth;
   (d) means for selectively opening and closing the envelope, including a fastener on the flap and a complementary fastener on one of the wall sections, said fasteners engaging each other with a snap-type action; and
   (e) means for holding the folded sheets in position relative to the major walls of the cassette during simultaneous insertion of the folded sheets with the tape cassette sandwiched therebetween into the envelope when the envelope is opened, including a pocket folder having two generally planar support portions, each overlying an outermost sheet portion of a respective folded sheet, and a base portion connecting the support portions, said support and base portions facing and engaging respective wall sections of the envelope after said insertion.

12. A transport/display package, comprising:
(a) a tape cassette for holding a magnetic tape for use in a magnetic recording/playback apparatus, said tape cassette having opposite major walls between which the tape is held;
(b) means for cushioning the tape cassette from exterior shocks, including at least one folded bedding sheet of soft fabric material folded over upon itself multiple times to form a plurality of generally rectangular sheet portions stacked one above another, a first set of said sheet portions being situated at one of said major walls of the cassette, a second set of said sheet portions being situated at the other said major wall of the cassette, said sets sandwiching the tape cassette therebetween, said sheet portions of each set being sufficient in number to cushion effectively the cassette from exterior shocks directed toward the respective major wall at which the respective set is situated;
(c) an envelope in which the sets of sheet portions and the tape cassette sandwiched therebetween are insertable;
(d) means for selectively opening and closing the envelope; and
(e) means for holding the sets of sheet portions in position relative to the major walls of the tape cassette during simultaneous insertion of the sets of sheet portions with the tape cassette sandwiched therebetween into the envelope when the envelope is opened.

* * * * *